United States Patent
Braun et al.

(10) Patent No.: US 7,269,300 B2
(45) Date of Patent: Sep. 11, 2007

(54) SHARPENING A DIGITAL IMAGE IN ACCORDANCE WITH MAGNIFICATION VALUES

(75) Inventors: Gustav J. Braun, Fairport, NY (US); Andrew C. Gallagher, Brockport, NY (US); Raymond W. Ptucha, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 734 days.

(21) Appl. No.: 10/692,536

(22) Filed: Oct. 24, 2003

(65) Prior Publication Data

US 2005/0089247 A1 Apr. 28, 2005

(51) Int. Cl.
*G06K 9/32* (2006.01)
(52) U.S. Cl. .................. 382/298; 382/263; 382/266
(58) Field of Classification Search ............. 358/1.2, 358/1.9, 3.27; 382/263, 266, 298–301; 345/619, 345/418
See application file for complete search history.

(56) References Cited

U.S. PATENT DOCUMENTS

| | | | |
|---|---|---|---|
| 4,571,635 A | 2/1986 | Mahmoodi et al. | |
| 4,761,819 A | 8/1988 | Denison et al. | |
| 5,051,842 A | 9/1991 | Shimazaki | |
| 5,081,692 A | 1/1992 | Kwon et al. | |
| 5,087,972 A * | 2/1992 | Sumi | 348/625 |
| 5,374,995 A * | 12/1994 | Loveridge et al. | 358/447 |
| 5,682,443 A | 10/1997 | Gouch et al. | |
| 6,091,861 A | 7/2000 | Keyes et al. | |
| 6,124,841 A * | 9/2000 | Aoyama | 345/636 |
| 6,167,165 A | 12/2000 | Gallagher et al. | |
| 6,222,173 B1 | 4/2001 | Meeussen et al. | |
| 6,990,249 B2 * | 1/2006 | Nomura | 382/254 |
| 7,050,649 B2 * | 5/2006 | Slavin | 382/275 |
| 2002/0063900 A1 * | 5/2002 | Fredlund et al. | 358/302 |
| 2002/0171855 A1 * | 11/2002 | Edge | 358/1.9 |
| 2003/0031375 A1 * | 2/2003 | Enomoto | 382/255 |

OTHER PUBLICATIONS

"Adaptive Image Sharpening Method Using Edge Sharpness" by Akira Inoue et al., IEICE Trans. Inf. & Syst. vol. E76-D, No. 10, Oct. 1993.

"Fundamentals of Digital Image Processing" by Anil Jain, Prentice Hall: 1989, pp. 249-251.

* cited by examiner

*Primary Examiner*—Joseph Mancuso
*Assistant Examiner*—Claire Wang
(74) *Attorney, Agent, or Firm*—Raymond L. Owens

(57) ABSTRACT

A method of processing a digital image having pixels to improve the sharpness of a print generated from the digital image including determining a magnification value representing the magnification of a pixel of the digital image on the print based on the number of input digital image pixels and the output number of digital image pixels; producing a filter in response to the magnification value; using the filter to operate on the digital image to adjust the sharpness of the digital image to produce a sharpened digital image; resizing according to the magnification value the sharpened digital image to produce a resized sharpened digital image which includes the output number of digital image pixels; and producing the print based on the resized sharpened digital image.

11 Claims, 3 Drawing Sheets

SHARPENING A DIGITAL IMAGE IN ACCORDANCE WITH MAGNIFICATION VALUES

FIELD OF INVENTION

The present invention relates to an improved method of sharpening a digital image for printing.

BACKGROUND OF THE INVENTION

In processing a digital image, it is common to sharpen the image to enhance fine detail with sharpening algorithms. Typically, sharpening is performed by a convolution process (for example, see A. K. Jain, *Fundamentals of Digital Image Processing*, Prentice-Hall: 1989, pp. 249-251). The process of unsharp masking is an example of a convolution-based sharpening process. For example, sharpening an image with unsharp masking can be described by the equation:

$$s(x,y)=i(x,y)b(x,y)+\beta f(i(x,y)-i(x,y)b(x,y)) \quad (0)$$

where:
   $s(x,y)$=output image with enhanced sharpness
   $i(x,y)$=original input image
   $b(x,y)$=lowpass filter
   $\beta$=unsharp mask gain factor
   $f(\ )$=fringe function
   ** denotes two dimensional convolution
   $(x,y)$ denotes the $x^{th}$ row and the $y^{th}$ column of an image Typically, an unsharp image is generated by convolution of the image $i(x,y)$ with a lowpass filter $b(x,y)$ (i.e., the unsharp image is given by $i(x,y)b(x,y)$). Next, a highpass, or fringe image is generated by subtracting the unsharp image from the original image (i.e., the highpass data is found with $i(x,y)-i(x,y)b(x,y)$). This highpass data is then modified by either a gain factor $\beta$ or a fringe function $f(\ )$ or both. Finally, the modified highpass data is summed with either the original image or the unsharp image to produce a sharpened image.

A similar sharpening effect can be achieved by modification of the image in a frequency domain (e.g., a Fourier domain) as is well known in the art of digital signal processing.

Digital images come in a variety of sizes (the number of rows and columns of pixels in an image describes the size of the image; also commonly referred to as resolution.) The size of digital image depends on many factors, including the inherent resolution of the image source (e.g. digital camera image sensor), digital camera settings, and whether and to what extent cropping or interpolation has been applied to the digital image.

When prints are generated from a digital image, generally the size of the print is specified. Common photographic print sizes are 4×6 inches, 8×10 inches, and 5×7 inches. Therefore, the magnification of the pixels of the digital image is dependent on the desired print size. The spatial area covered on the print by each pixel of the digital image is dependent on the print size.

If a digital sharpening process is applied without knowing the magnification required to generate a print, there is no way of knowing which spatial frequencies of the print will be affected. Therefore, sharpening the digital image without knowing the size of the desired print results in sub-optimal quality.

One solution to this problem is to resize the digital image using interpolation to a normalized size, such that spatial area covered on the print by each pixel of the resized digital image is standard. Then a standard sharpening is applied to resized digital image in preparation for printing. Generally, this process results in increasing the resolution of most digital images through interpolation. This in turn requires that more pixels be sharpened, which is inefficient.

Another problem associated with sharpening digital images is that sharpening amplifies noise and other artifacts—e.g. the artifacts associated with JPEG compression, which is commonly used to reduce the file size of an image.

It is occasionally desirable to sharpen different regions or pixels of the image by different amounts. For example, is it has been suggested that it is desirable to sharpen the pixels representing human faces to a lesser degree than pixels representing a building. For example, in U.S. Pat. No. 5,682,443 Gouch et al. describe the modification of the gain of the unsharp mask based on the color of a pixel (and the color of the surrounding neighborhood). Gouch did not describe sharpening of an image taking into account the magnification. In addition, Gouch's sharpening method is not designed to minimize the amplification of compression artifacts.

Alternatively, in U.S. Pat. No. 4,571,635, Mahmoodi and Nelson teach a method of deriving a gain factor $\beta$ that is used to scale the high frequency information of the digital image depending on the standard deviation of the image pixels within a neighborhood. In addition, in U.S. Pat. No. 5,081,692, Kwon and Liange teach that a gain factor $\beta$ is based on a center weighted variance calculation. In U.S. Pat. No. 4,761,819, Denison describes a method where the gain factor of an unsharp mask is dependent on both a local variance calculation and a noise statistic. While these methods do indeed sharpen the image while attempting to minimize noise amplification, they are computationally complex. In addition, neither describes sharpening an image taking into account the magnification, or sharpening while minimizing the amplification of compression artifacts.

Shimazaki in U.S. Pat. No. 5,051,842 describes an apparatus which generates unsharp signals from images, derives two parameters based on either the image signal level or the unsharp signal level from a pre-determined lookup table, multiplies one parameter with the image signal, multiplies the other parameter with the unsharp signal, and adds the two resulting signals to obtain the final image signal. One embodiment requires that the sum of the two parameters equal one for all image signal levels. In this case, the method is mathematically equivalent to the unsharp mask equation. Shimazaki teaches that the two parameters are signal dependent with the signals representing image highlights resulting in the highest degree of sharpening. The two parameters are chosen such that the sharpening decreases as either the image signal or the unsharp signal decreases until the sharpening level is zero. At that point, the sharpening converts to blurring as the image signal or unsharp signal continue to decrease into the shadow region of the density range. Shimazaki did not describe sharpening of an image taking into account the magnification. In addition, Shimazaki's sharpening method is not designed to minimize the amplification of compression artifacts.

Gallagher and Gindele, in U.S. Pat. No. 6,167,165 describe a method of selecting a gain for an unsharp mask based on a local intensity level. Gallagher does not describe sharpening of an image taking into account the magnification. In addition, Gallagher's sharpening method is not designed to minimize the amplification of compression artifacts.

Keyes and Hoff, in U.S. Pat. No. 6,091,861 describe a method of selecting a constant, position independent gain factor based on the exposure of the image. Lower gain factors will be selected for images that are underexposed, thereby providing less gain for that image than for a normally exposed image. Keyes describes sharpening of an image by setting a sharpening amount based in part on the image magnification. However, the Keyes method only varies the gain of a fixed filter. Unfortunately, this method produces sub-optimal effects for different spatial frequencies because the frequency response of the lowpass filter is constant. Prints of equal size made from digital images having different numbers of rows and columns of pixels would have an inconsistent look. This results from the frequency response of the blurring filter being fixed with respect to cycles per pixel, rather than being fixed with respect to a physical property of the print itself (e.g cycles per mm on the print, or cycles per degree.) In addition, the Keyes sharpening method is not designed to minimize the amplification of compression artifacts.

Inoue and Tajima describe an adaptive method of determining a gain factor by analyzing the image and searching for edges in the article "Adaptive Image Sharpening Method Using Edge Sharpness," IEICE Transactions on Information and Systems, vol. E76-D, no. 10, p. 1174-80, October 1993. The authors describe a sharpening where the spatial frequency characteristics of a filter are properly described in terms of spatial frequencies (cycles/degree) (see FIG. 4 and Equation 6 of the article). However, the authors do not describe an efficient method for generating the filter for images having various numbers of rows and column of pixels. In addition, the method is not designed to minimize the amplification of compression artifacts.

In U.S. Pat. No. 6,222,173, Meeussen describes a method of sharpening and resizing images to prevent the occurrence of images that are not crispy. The method involves combining a sharpening filter with the interpolation filter before application to the image. The method does not ensure that the image sharpening properly enhances the desired spatial frequencies of an output print. In addition, the method does not prevent the amplification of compression artifacts.

SUMMARY OF THE INVENTION

It is an object of the present invention to make use of the required magnification of the digital image to produce a sharpened digital image for printing.

This object is achieved by a method of processing a digital image having pixels to improve the sharpness of a print generated from the digital image comprising:

a) determining a magnification value representing the magnification of a pixel of the digital image on the print based on the number of input digital image pixels and the output number of digital image pixels;

b) producing a filter in response to the magnification value;

c) using the filter to operate on the digital image to adjust the sharpness of the digital image to produce a sharpened digital image;

d) resizing according to the magnification value the sharpened digital image to produce a resized sharpened digital image which includes the output number of digital image pixels; and e) producing the print based on the resized sharpened digital image.

An advantage of the present invention is that the magnification value is used in producing a filter to sharpen a digital image, thereafter the sharpened digital image is resized in accordance with the magnification value to provide a high quality output print. The present invention can make use of metadata in addition to the magnification value to further improve the quality of the output print.

An advantage of the present invention is that the digital image is sharpened prior to resizing the digital image thereby reducing the computational complexities.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 1:
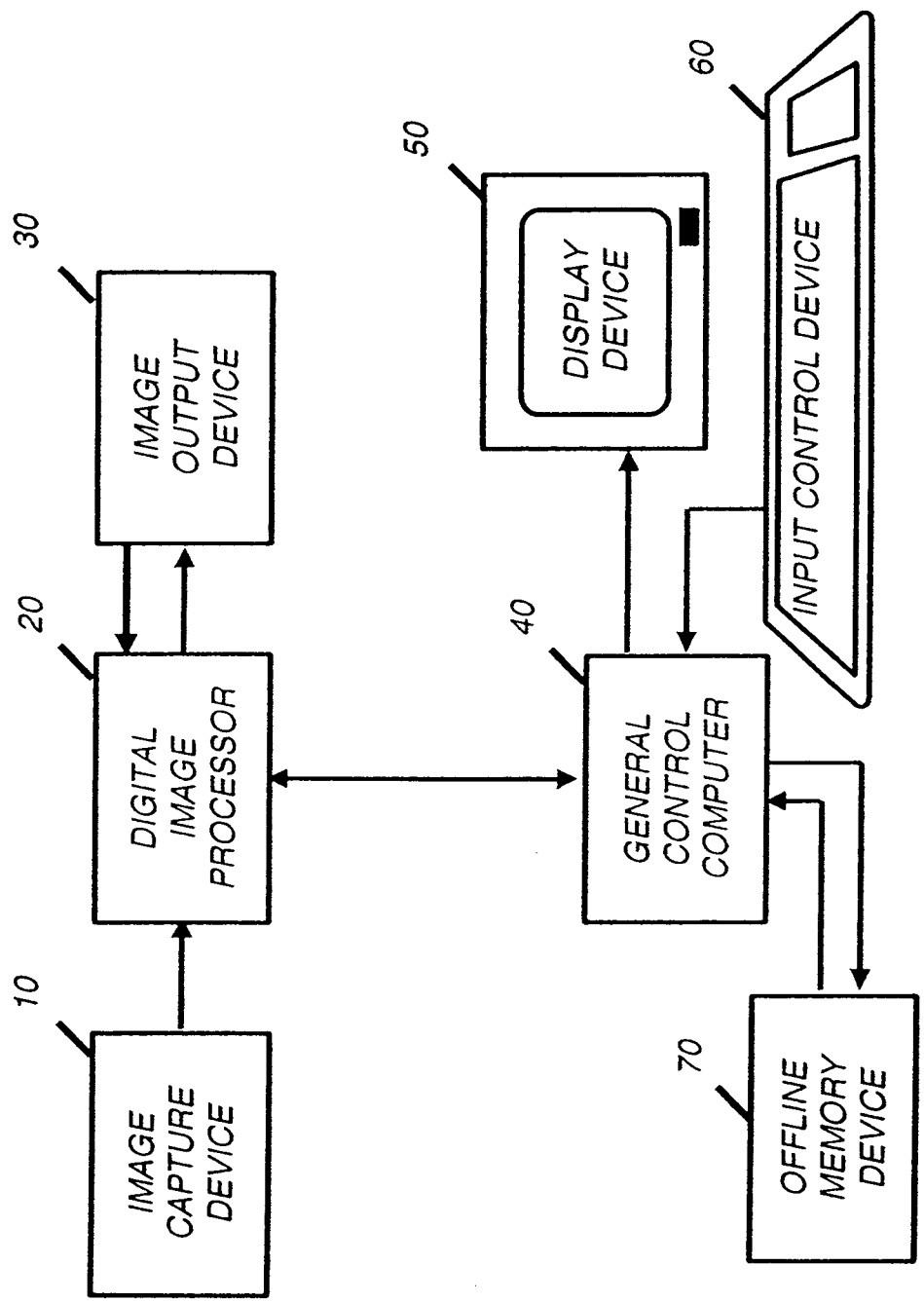
FIG. 1 is a block diagram of a computer system suitable for practicing the present invention.

The present invention may be implemented in computer hardware. Referring to FIG. 1, the following description relates to a digital imaging system which includes an image capture device 10, a digital image processor 20, an image output device 30, and a general control computer 40. The system can include a display device 50 such as a computer console or paper printer. The system can also include an input control device 60 for an operator such as a keyboard and or mouse pointer. The present invention can be used on multiple image capture devices 10 that produce digital images. For example, FIG. 1 can represent a digital photofinishing system where the image capture device 10 is a conventional photographic film camera for capturing a scene on color negative or reversal film, and a film scanner device for scanning the developed image on the film and producing a digital image. Alternatively, the image capture device 10 could be a digital camera. The digital image processor 20 provides the means for processing the digital images to produce pleasing looking images on the intended output device or media. The present invention can be used with a variety of image output devices 30 that can include, but are not limited to, a digital photographic printer, an inkjet printer, and a soft copy display. The digital image processor 20 can be used to process digital images to make adjustments for overall brightness, tone scale, image structure, etc. of digital images in a manner such that a pleasing looking image is produced by an image output device 30. Those skilled in the art will recognize that the present invention is not limited to just these mentioned image-processing functions.

The general control computer 40 shown in FIG. 1 can store the present invention as a computer program stored in a computer program product, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 70. Before describing the present invention, it facilitates understanding to note that the present invention is preferably utilized on any well-known computer system, such as a personal computer.

It should also be noted that the present invention can be implemented in a combination of software and/or hardware and is not limited to devices that are physically connected and/or located within the same physical location. One or more of the devices illustrated in FIG. 1 may be located remotely and may be connected via a wireless connection.

A digital image is comprised of one or more digital image channels. Each digital image channel is comprised of a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the above-mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values.

Figure 2:
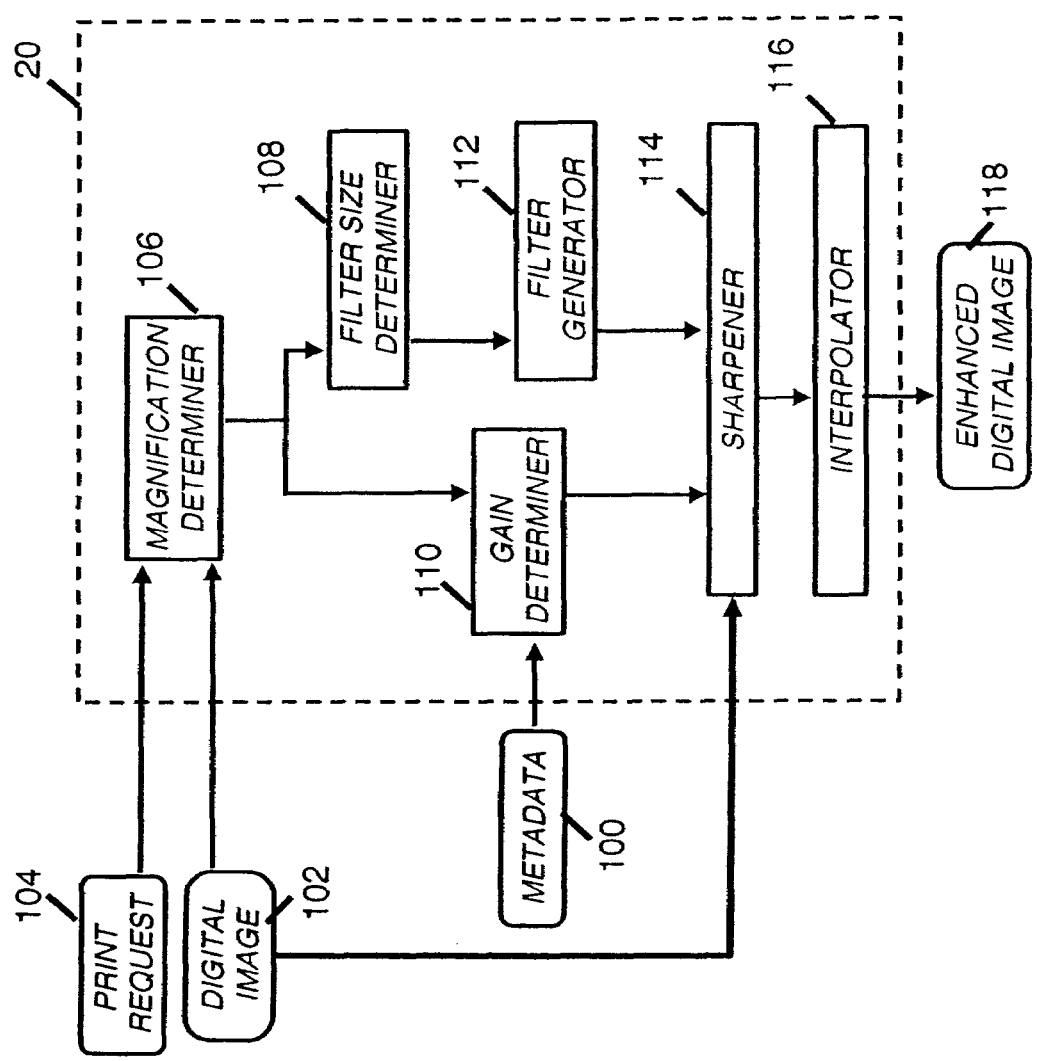
FIG. 2 is a block diagram of the digital image processor of FIG. 1 according to the present invention.

The digital image processor 20 shown in FIG. 1 is programmed to perform the method of the present invention is illustrated in more detail in FIG. 2. An original digital image 102 can be received from the image capture device (shown in FIG. 1) in a variety of different color representations. However, the most typical implementation of the present invention receives the original digital image as a color digital image with red, green, and blue digital image channels. Preferably, the pixel values of the original digital image are in the sRGB color space. The present invention can operate successfully with other encodings, although modification to equation constants and shapes of functions may be required.

The digital image 102 is input to a magnification determiner 106. A print request 104 is also input to the magnification determiner 106. The purpose of the magnification determiner 106 is to calculate the size on the print of each pixel of the digital image 102. The print request 104 contains a specified desired size for the output print. Preferably, the print request 104 contains the desired print size P for the shorter dimension of the image. Then the magnification value (M) is found by the magnification determiner 106 by dividing the number of pixels along one dimension of the new digital image by the corresponding dimension of the print:

$$M=X/P \qquad (1)$$

Where:

X is the number of pixels along the shorter dimension of the digital image 102.

In essence, the magnification value is found by considering the relationship between the size (in pixels) of the digital image and the size (in linear distance or in pixels) of the output print. For example, if the digital image has 1000×1500 pixels and the desired print size (short dimension) is 4 inches, then the magnification is M=250 pixels per inch.

Those skilled in the art will recognize that the magnification value can be computed in other ways that achieve the same goal. For example, the print request 104 may specify both dimensions (width and height) of the desired print size. If the aspect ratio (ratio of with to height) of the image in pixels is the same as the aspect ratio of the print, then M is found as described before. However, if the aspect ratios are different, then either the digital image must be cropped (remove rows and /or columns of pixels) or padded (add rows and/or columns of pixels) to create a new digital image having the same aspect ratio as the print. In this case, M is again found by dividing the number of pixels along one dimension of the new digital image by the corresponding dimension of the print.

The magnification value M is output from the magnification determiner 106 and input to a filter size determiner 108. The purpose of the filter size determiner 108 is to set a size parameter of the lowpass filter for use in an unsharp mask. The size parameter σ can be determined from the magnification factor M with a look-up-table. Preferably, the size parameter σ is found according to the equation:

$$\sigma=M/D \qquad (2)$$

where D is the resolution (in units of pixels per inch) of an output display device such as a computer display or a printer (e.g., 250 dpi). In the preferred embodiment, the size parameter σ relates to the number of pixels per standard deviation in a Gaussian lowpass filter.

A filter generator 112 inputs the size parameter σ from the filter size determiner 108. The purpose of the filter generator 112 is to generate, in response to the magnification value, a lowpass filter for convolution. The Gaussian filter is a two-dimensional, circularly symmetric, low-pass filter whose filter coefficients may be derived by the following formula that is well known in the art:

$$b(i, j) = \frac{1}{\sigma\sqrt{2\pi}} \exp\left[\frac{-(i^2 + j^2)}{2\sigma^2}\right] \qquad (3)$$

where:

b(i,j)=the Gaussian filter coefficient at the (i, j)$^{th}$ pixel

σ=the standard deviation of the Gaussian filter

π=the constant approximately 3.14159265 . . .

The Gaussian filter is more efficiently implemented as a separable filter as is well known in the art of digital signal processing. The equation for the vertical separable Gaussian filter is:

$$b(i, 0) = \frac{1}{\sigma\sqrt{2\pi}}\exp\left[\frac{-i^2}{2\sigma^2}\right] \qquad (4)$$

where:

$b(i,j)$=the Gaussian filter coefficient at the $(i, j)^{th}$ pixel
$\sigma$=the standard deviation of the Gaussian filter
$\pi$=the constant approximately 3.14159265 . . .

The filter generator 112 outputs the filter $b(i,j)$ to a sharpener 114. The filter generator 112 can alternatively generate the filter by having a pre-stored set of filters. Then the generated filter $b(i,j)$ is found by performing a look up operation, where the size parameter $\sigma$ is used as an index to select a specific filter from the pre-stored set of filters.

As a further alternative, the filter generator 112 can create the filter by sampling any other continuous function (e.g., a standard lowpass filter) in accordance with the magnification value to produce coefficients of a new lowpass filter. In this case, an interpolation factor is determined; preferably the interpolation factor is $1/\sigma$. Then, the lowpass filter is calculated by sampling the continuous function at sample locations having an interval (equal to the interpolation factor $1/\sigma$) between sample locations.

Alternatively, the filter generator 112, can produce the lowpass filter used to sharpen the image using the unsharp-masking process can be acquired by providing a default discrete digital filter and adjusting the coefficients of the default filter in accordance with the magnification factor. This process is directly analogous to the previously mentioned process of sampling a continuous function in accordance with the interpolation factor. The default filter in sampled using a discrete sampling function at points $(1/\sigma)$ to produce a resampled filter. For example, if the standard lowpass filter is a 1×5 pixel filter (5 non-zero kernel values), and the interpolation factor is 0.5, then the filter generator 112 calculates an output filter having 9 non-zero values. Interpolation can be accomplished by any of several means well known in the art such as linear interpolation. Special care needs to be used when generating said sampling function to ensure that the resampling process is performed within the support of the default filter.

The effect of using the magnification value M to generate the filter (with the filter generator 112) used in the sharpening process, is that a constant spatial frequency boost is provided without regard to the size (in pixels) of the input image. In prior art methods, the input image is sharpened first and then resized to the resolution of the output writing device. The spatial frequency response of the sharpening kernel is scaled according to the interpolation factor used to convert the sharpened image to the resolution of the output printer. This prior art method results in inferior print quality because the sharpening effect with respect to spatial frequency varies according to the digital image dimensions in pixels.

Figure 3:
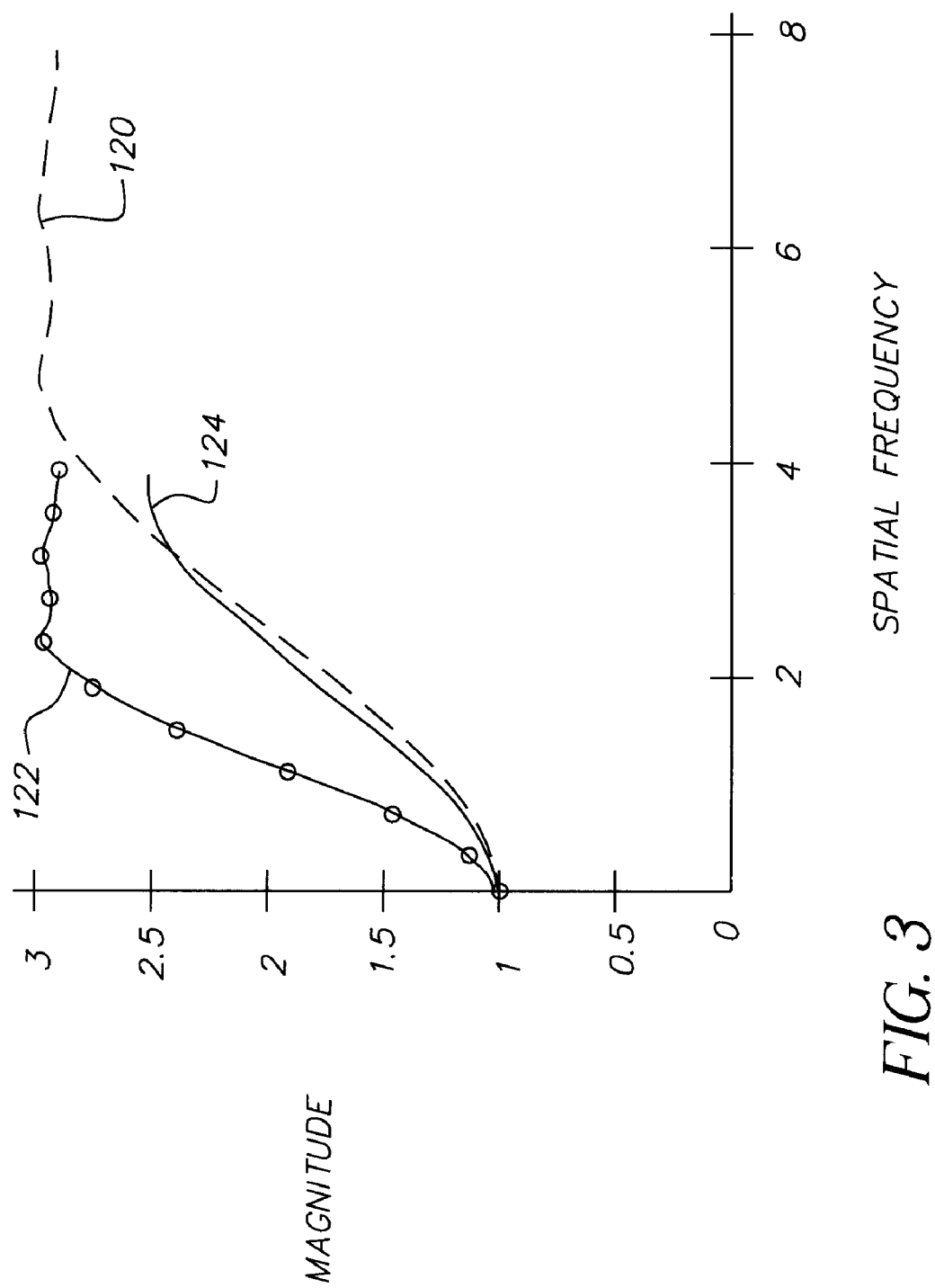
FIG. 3. is a graph of magnitude versus frequency illustrating the effects of kernel resampling.

Referring to FIG. 3, consider the sharpening process that results in a spatial frequency boost according to a solid curve 120. In this case, the image resolution matches the resolution of the output-writing device—as such, the interpolation factor and the magnification value M is one. This graph illustrates the magnitude versus frequency of the sharpening and resizing process. For cases where the interpolation factor is two, the spatial frequency response of the sharpening kernel follows a curve 122 denoted by the (o) symbol. This curve illustrates the spatial frequency effects of sharpening an image (with the same digital filter used to produce curve 120) followed by an interpolation by 2. It is clear that the spatial frequency effects are quite different. Images sharpened (with the default filter) and then interpolated to the printer resolution using the 2-times interpolation factor are more likely to contain image structure features (such as noise or blocking) that will now be more visible because of the extra low frequency boost resulting from interpolating the sharpened image. In order to keep the frequency response of the sharpening kernel constant across interpolation factors the aforementioned kernel resampling process is applied by the filter generator 112 to produce a digital filter $b(i,j)$. Still referring to FIG. 3, a resulting frequency response of the kernel $b(i,j)$ followed by an resizing step (interpolation by 2) resampling process is shown by the curve 124 labeled with the (+) symbol. Note that the spatial frequency response of this kernel is more similar to that of the default (curve 120). Thus, noise amplification is suppressed in this case Referring again to FIG. 2, a gain determiner 110 inputs metadata 100 (data related to the digital image 102, not including the values of the pixels themselves) and determines the gain $\beta$ used to sharpen the image. Conceptually, the filter generator 112 determines the shape of the frequency response of the sharpening operation applied by the sharpener 114, while the gain determiner 110 determines the gain $\beta$ or magnitude of the sharpening operation applied by the sharpener 114.

The gain determiner 110 determines the gain $\beta$ by making a combination of the metadata values as expressed with the following formula:

$$\beta = \alpha_0 + \alpha_1 M_1 + \alpha_2 M_2 + \alpha_3 M_3 + \ldots \alpha_n M_n \qquad (5)$$

Where: $\alpha_k$ is the $k^{th}$ (for k=0, 1, . . . n) coefficient of the gain determiner and $M_k$ is the $k^{th}$ metadata attribute for the input image $i(x,y)$. In a preferred embodiment of the present invention the gain determiner, given in Equation 5, includes coefficients and metadata (i.e., factors) for:

$\alpha_1$=a coefficient for a camera focal length used to capture an image=0.014,
$M_1$=a focal length of the camera used to capture the image,
$\alpha_2$=a coefficient for a camera ISO used to capture an image=−0.0017,
$M_2$=an ISO value for the camera used to capture an image,
$\alpha_3$=an image compression factor coefficient=0.011,
$M_3$=an image compression factor calculated for an image,
$\alpha_4$=an interpolation factor coefficient=−0.43,
$M_4$=an interpolation factor calculated for an image, and
$\alpha_0$=an offset coefficient=1.70.

These parameters were obtained with psychovisual experiments. Observers selected optimally sharpened prints out of a variety of choices. Regression analysis was then performed to determined which metadata items are most effective for determining the gain factor $\beta$. Often times these and other metadata items are stored in the digital file that contains digital image data.

In a preferred embodiment of the present invention the default low-pass filter used in the sharpening process is a 1×5 element filter with the coefficients of [0.1004, 0.2396, 0.3200, 0.2396, 0.1004].

An example of an image compression factor is obtained for a JPEG image file by comparing the quantization table associated with the luminance channel of said JPEG compressed image to a reference quantization table. The degree of similarity between the aforementioned quantization tables can be used to form a compression factor.

These metadata items are ones that are commonly associated with a digital image or ones that are calculated from characteristics of a given digital image 102. This formula and its coefficients are based on empirical data from tests where subjects selected the preferred gain value for many different images having many different values of metadata items. Metadata can include but is not limited to the following:

Time and Date of image capture
Location of Image
Number of people present in image
Number of faces in image
Amount/location of human flesh
Aperture
Focal length
Shutter speed
Lens MTF
Flash fire information
Camera manufacturer
Brightness value
Subject to camera distance
Image source (e.g digital camera vs. film scan)
Image sensor speed (e.g. ISO rating)

Other metadata items that can be used to calculate the gain value $\beta$ include parameter settings for image processing algorithms that have been or will be applied to the digital image. For example, in the case where a scene dependent tone scale function or a balance value is applied to the digital image, the tone scale function or parameters derived from the tone scale function can be used to determine the gain value $\beta$. Generation and application of scene dependent tone scale functions is described in U.S. Pat. No. 6,285,798. U.S. patent application Publication No. 20030039401A1 describes a method of using the tone scale function and noise information (both metadata items) to produce a noise estimate for the image. The noise estimate is a metadata item that can be used to determine the gain value. As an additional example, when a noise reduction process (e.g. J. S. Lee, "Digital Image Smoothing and the Sigma Filter", *Computer Vision, Graphics, and Image Processing*, Vol. 24, pp. 255-269, 1983) is used, generally the value of $\beta$ can be increased. Thus a noise value flag (a metadata item) indicating whether noise reduction is applied to the image is useful for determining the value of $\beta$. Therefore the gain value is calculated in response to a tone scale value (the tone scale function), a balance value, a noise value or combinations thereof.

The sharpener 114 inputs both the gain value $\beta$ and the filter b(i,j) and the digital image 102, and adjusts the sharpness of the digital image, producing a sharpened digital image. The sharpener 114 sharpens the digital image 102 using the gain and filter as an unsharp mask, as is well known in the art.

The operation of the sharpener 114 can be represented with the following equation:

$$s(x,y)=R(x,y)b(x,y)+\beta(x,y)f(R(x,y)-R(x,y)b(x,y)) \quad (6)$$

where:
s(x,y)=output image with enhanced sharpness
R(x,y)=digital image
b(x,y)=lowpass filter (described above)

$\beta(x,y)$=unsharp mask gain factor for location (x,y). Preferably in the value $\beta(x,y)$ is a constant. However, as an alternative, the gain value may vary with position (x,y) within the image.
f( )=fringe function (preferably identity f(g)=g;)
R(x,y)**b(x,y)=lowpass image (also called unsharp image)
R(x,y)-R(x,y)**b(x,y)=highpass image
** denotes two dimensional convolution
(x,y) denotes the $x^{th}$ row and the $y^{th}$ column of an image The sharpener 114 can effectively be bypassed (made to have an identity effect) when either the gain $\beta$ is 1.0 or the filter b(i,j) is a delta function. When either of these conditions exist, it is most efficient that the sharpener 114 does not explicitly evaluate Equation (6), but rather simply output the digital image, as the sharpening operation would not change it.

Those skilled in the art will recognize that there are several methods by which unsharp masking (such as provided by Eq. (6)) can be applied to a color image having multiple channels. For example, the unsharp mask process can be applied to each channel of the color image. Preferably, the unsharp mask process is applied in the following manner, commonly known in the art:

Assuming the input image is a color image consisting of red, green, and blue color channels, a matrix is first applied to the image in order to produce a luminance channel and two or more color difference channels. The luminance channel l(x,y) is created by linearly combining all the color channels of the image. For example:

$$l(x, y) = \sum_{n=0}^{n=C-1} a_n c_n(x, y) \quad (7)$$

where:
C is the number of image channels,
$c_n$ is the $n^{th}$ color channel of the image i(x,y)
$a_n$ is the coefficient weighing factor for the nth color channel. The sum of all the coefficient weighting factors is preferably 1.0.

In the case of an image i(x,y) having red, green, and blue channels, the preferred values for the red, green, and blue coefficient weighting factors are all equally ⅓. Next the unsharp mask process is applied by the sharpener 114 to the luminance channel. Finally, an inverse matrix is applied to the luminance and color difference channels to generate an enhanced color image having red green and blue channels.

Alternatively, the unsharp mask process may be applied to only a single image channel (e.g. the green channel), and the modified highpass data may be summed with each color channel in order to generate an enhanced color image. These and other similar modifications and enhancements to the unsharp mask process would be well understood by those of skill in this art. Since the particularities of their usage are not fundamentally related to the method of selecting sharpening parameters for the variable gain sharpening, their particular application does not act to in any way limit the scope of the invention.

Those skilled in the art will also recognize that although Eq. (2) and the present invention generally describe the sharpening applied to the image as being performed by an unsharp mask, that is not necessarily the case. Assuming the fringe function f( ) of Eq. (4) is identity, the unsharp mask process can be reconfigured as a single filter than can be applied with convolution to the image and produce results identical to the unsharp mask. For example, suppose the filter coefficients of b(x,y) are given as:

$$b(x, y) = \frac{\begin{bmatrix} 1 & 2 & 1 \\ 2 & 4 & 2 \\ 1 & 2 & 1 \end{bmatrix}}{16}. \quad (8)$$

Application of a filter c(x,y) with a convolution having coefficients given as:

$$c(x, y) = \frac{\begin{bmatrix} 1-\beta & 2(1-\beta) & 1-\beta \\ 2(1-\beta) & 4(1+3\beta) & 2(1-\beta) \\ 1-\beta & 2(1-\beta) & 1-\beta \end{bmatrix}}{16} \quad (9)$$

will produce identical results compared with using filter b(x,y) in the unsharp mask of Equation (4). Such modifications to the preferred embodiment by the grouping of operations in the image sharpener 114 such as can be determined by methods well known in algebra and digital signal processing will be evident to those of skill in this art and are within the scope of the present invention.

Each channel of the digital image may be operated upon by the sharpener 114. Preferably, each color channel is treated in an independent manner. Alternatively, it may sometimes be desirable for the gain factor β to be fixed across color channels at each pixel location (x,y) throughout the image.

The sharpener 114 outputs a sharpened image that is input to an interpolator 116. The interpolator 116 resizes the sharpened image to have the proper resolution for the image output device 30 of FIG. 1. For example, if the print request 104 specifies that a 4×6 print is desire 30 operates at 300 pixels per inch, then the interpolator 116 resizes the sharpened image to have 1200 by 1800 pixels. Alternatively, the image could be re-sized to have slightly more rows and columns of pixels (e.g. 1260 by 1890 pixels) to account for overprinting to ensure that the image extends beyond the photographic print edges to avoid the creation of a print with (unintended) white image borders. Interpolation of a image is well known in the art and can be accomplished by using a filtering and a sub-sampling step. Preferably, either bilinear or bicubic interpolation are performed by the interpolator 116. The interpolator 116 can increase the number of pixels in the image, decrease the number of pixels in the image, or leave the image unchanged, as appropriate such that the resized sharpened digital image includes the necessary output number of digital image pixels to generate the print. An enhanced digital image 118 is a resized sharpened digital image and is sent to the image output device of FIG. 1 for producing a print.

The method of the present invention can be performed in a digital camera, a digital printer, or on a personal computer.

The method of the present invention can be used in a system designed to print digital images. In this case the present invention will improve the sharpness of a print generated from that system. Those skilled in the art will recognize that a similar system will successfully prepare the sharpness of an image for viewing on a display such as a CRT monitor, an LCD screen or even by overhead projection onto a projection screen.

The invention has been described in detail with particular reference to certain preferred embodiments thereof, but it will be understood that variations and modifications can be effected within the spirit and scope of the invention.

PARTS LIST

10 image capture device
20 digital image processor
30 image output device
40 general control computer
50 display device
60 input control device
70 offline memory device
100 metadata
102 digital image
104 print request
106 magnification determiner
108 filter size determiner
110 gain determiner
112 filter generator
114 sharpener
116 interpolator
118 enhanced digital image
120 curve
122 curve
124 curve

What is claimed is:

1. A method of processing a digital image having pixels to improve the sharpness of a print generated from the digital image comprising:
   a) determining a magnification value representing the magnification of a pixel of the digital image on the print based on a number of input digital image pixels and an output number of digital image pixels;
   b) producing a filter that has a frequency response that is a function of the magnification value;
   c) using the filter to operate on the digital image to adjust the sharpness of the digital image to produce a sharpened digital image;
   d) resizing according to the magnification value the sharpened digital image to produce a resized sharpened digital image which includes the output number of digital image pixels; and
   e) producing the print based on the resized sharpened digital image.

2. The method of claim 1 further including providing a continuous function and sampling the continuous function in accordance with the magnification value to produce coefficients of the filter.

3. The method of claim 1 including providing a default filter and adjusting the coefficients of such filter in accordance with the magnification value.

4. The method of claim 1 wherein the resizing according to the magnification value includes bilinear or bicubic interpolation.

5. A method of processing a digital image having pixels to improve the sharpness of a print generated from the digital image comprising:
   a) determining a magnification value representing the magnification of a pixel of the digital image on the print based on the number of input digital image pixels and the output number of digital image pixels;

b) producing a filter that has a frequency response that is a function of the magnification value;
c) using metadata associated with the digital image to produce a gain value;
d) using the lowpass filter and the gain value to operate on the digital image to adjust the sharpness of the digital image to produce a sharpened digital image;
e) resizing according to the magnification value the sharpened digital image to produce a resized sharpened digital image which includes the output number of digital image pixels; and
f) producing the print based on the resized sharpened digital image.

6. The method of claim 5 wherein the metadata includes ISO, focal length, compression factor, or default.

7. The method of claim 5 wherein the gain value is computed by making a computation of the metadata.

8. The method of claim 5 wherein the lowpass filter and gain values are used in an unsharp masking process.

9. The method of claim 5 wherein the gain value is calculated in response to a balance value, a tonescale value, a noise value or combinations thereof.

10. The method of claim 5 where the gain value is calculated in response to a noise reduction process.

11. The method of claim 1 where the gain value is calculated in response to a noise reduction process.

* * * * *